US012722142B2

(12) United States Patent
Kai et al.

(10) Patent No.: US 12,722,142 B2
(45) Date of Patent: Sep. 1, 2026

(54) SURFACE MOLECULARLY IMPRINTED MAGNETIC NANOMETER MATERIAL OF SALVIANOLIC ACID A, PREPARATION METHOD THEREFOR AND USE THEREOF

(71) Applicant: ZHEJIANG CHINESE MEDICAL UNIVERSITY, Hangzhou (CN)

(72) Inventors: Guoyin Kai, Hangzhou (CN); Jun Qian, Hangzhou (CN); Xiaoqian Xu, Hangzhou (CN)

(73) Assignee: ZHEJIANG CHINESE MEDICAL UNIVERSITY, Hangzhou (CN)

( * ) Notice: Subject to any disclaimer, the term of this patent is extended or adjusted under 35 U.S.C. 154(b) by 626 days.

(21) Appl. No.: 18/193,577

(22) Filed: Mar. 30, 2023

(65) Prior Publication Data

US 2023/0241583 A1 Aug. 3, 2023

Related U.S. Application Data

(63) Continuation of application No. PCT/CN2022/103501, filed on Jul. 2, 2022.

(30) Foreign Application Priority Data

Jul. 27, 2021 (CN) ........................ 202110851099.6

(51) Int. Cl.

*B01J 20/28* (2006.01)
*B01D 11/04* (2006.01)
(Continued)

(52) U.S. Cl.

CPC ..... *B01J 20/28009* (2013.01); *B01D 11/0492* (2013.01); *B01J 20/0229* (2013.01);
(Continued)

(58) Field of Classification Search

CPC .. B01J 20/28009; B01J 20/0229; B01J 20/10; B01J 20/28016; B01J 20/3078; B01J 20/3234; B01D 11/0492
See application file for complete search history.

(56) References Cited

U.S. PATENT DOCUMENTS

2017/0174542 A1 6/2017 Lu et al.
2020/0408689 A1 12/2020 Jin et al.

FOREIGN PATENT DOCUMENTS

CN 102145279 A 8/2011
CN 102304205 A 1/2012
(Continued)

OTHER PUBLICATIONS

Zhu et al, "Characterization and Evaluation of Binding Properties of Salvianolic Acid A Imprinted Polymers Prepared by Precipitation Polymerization", Advanced Materials, Research, 239-242, 2011, 2423-2426 (Year: 2011).*
(Continued)

*Primary Examiner* — Michael Forrest
*Assistant Examiner* — Nicole Lee Quist
(74) *Attorney, Agent, or Firm* — Wiersch Law Group

(57) ABSTRACT

Providing a surface molecularly imprinted magnetic nanomaterial of salvianolic acid A, a preparation method therefor and use thereof. The nanomaterial is obtained by using ferroferric oxide nanoparticles as a core, salvianolic acid A as a template molecule, 4-acryloyloxy phenylboronic acid, vinyl imidazole and methacryloylpropyl trimethyl ammonium chloride as copolymerization functional monomers, bismethylene acrylamide as a cross-linking agent, and azoamidine initiator V50 as an initiator, synthesizing surface imprinted magnetic material containing template molecules by surface polymerization, and finally eluting the template molecule with 0.1 M HCl. It is a spherical particle with a core-shell structure of about 250 nm, with positive charge on
(Continued)

the surface and strong hydrophilicity, which can be recycled. Moreover, this magnetic material is easy to be separated by a magnet. The surface molecularly imprinted magnetic nanomaterial prepared by the present application can be used for rapid, large-capacity and high-selectivity separation and enrichment of salvianolic acid A.

5 Claims, 6 Drawing Sheets

(51) Int. Cl.

| | |
|---|---|
| ***B01J 20/02*** | (2006.01) |
| ***B01J 20/10*** | (2006.01) |
| ***B01J 20/30*** | (2006.01) |
| ***B01J 20/32*** | (2006.01) |

(52) U.S. Cl.

CPC ......... *B01J 20/10* (2013.01); *B01J 20/28016* (2013.01); *B01J 20/3078* (2013.01); *B01J 20/3234* (2013.01); *B01D 2253/1124* (2013.01); *B01D 2253/25* (2013.01); *B01D 2253/304* (2013.01); *B01J 2220/42* (2013.01); *B01J 2220/4806* (2013.01)

(56) References Cited

FOREIGN PATENT DOCUMENTS

| | | | | | |
|---|---|---|---|---|---|
| CN | 103059206 | A | | 4/2013 | |
| CN | 103100377 | A | | 5/2013 | |
| CN | 105921129 | A | | 9/2016 | |
| CN | 106117411 | A | | 11/2016 | |
| CN | 111825814 | A | * | 10/2020 | ............ C08F 292/00 |
| CN | 113617338 | A | | 11/2021 | |

OTHER PUBLICATIONS

CN 111825814 machine translation (Year: 2020).*

International Search Report (PCT/CN2022/103501); Date of Mailing: Sep. 8, 2022.

CN Notice Of Allowance(CN202110851099.6); Date of Mailing: Nov. 2, 2022.

Preparation-of-molecularly-imprinted-polymer-and-its-recognition-property-for-salvianolic-acid-A.

* cited by examiner

SURFACE MOLECULARLY IMPRINTED MAGNETIC NANOMETER MATERIAL OF SALVIANOLIC ACID A, PREPARATION METHOD THEREFOR AND USE THEREOF

CROSS-REFERENCE TO RELATED APPLICATIONS

The present application is a National Stage of International Application No. PCT/CN2022/103501, filed on Jul. 2, 2022, which claims priority to Chinese Patent Application No. 202110851099.6, filed on Jul. 27, 2021, both of which are hereby incorporated by reference in their entireties.

TECHNICAL FIELD

The present application belongs to the technical field of adsorbent preparation, in particular to a surface molecularly imprinted magnetic nanomaterial of salvianolic acid A and use thereof.

BACKGROUND

Salvianolic acid A is a water-soluble phenolic acid compound in *Salvia miltiorrhiza* Bunge. It has a wide range of pharmacological activities, and has shown good preventive and therapeutic effects on cardiovascular and cerebrovascular diseases, liver fibrosis, diabetes and complications, tumors and other diseases. However, the content of salvianolic acid A in *Salvia miltiorrhiza* Bunge is low, and the content of salvianolic acid A in *Salvia miltiorrhiza* Bunge from different habitats is only about 0.01-0.03% (Zhang Li, Zhang Weiku, Zhao Ying, et al, China Journal of Traditional Chinese Medicine, 2011, 36(19): 2603-2609). Compared with other water-soluble phenolic acid components in *Salvia miltiorrhiza* Bunge which are relatively easy to extract and separate, the extraction and separation steps of salvianolic acid A are more complicated and the yield is lower.

At present, the separation methods of the single component of salvianolic acid A mainly focus on chromatographic separation, including column chromatography and high-speed countercurrent chromatography (Lu L, Zhang H, Qian Y, et al, Natural Product Communications, 2010, 5 (5): 805-808). In contrast, adsorption is a more promising separation method because of its simple operation and high efficiency. The key core of the adsorption method is to have efficient adsorption and separation materials. Some related researchers have designed and synthesized some adsorption materials for adsorption and separation of salvianolic acid compounds (Zhang Q, Zhou D D, Zhang J W, et al, Talanta, 2019, 195: 354-365). However, traditional adsorption materials have some problems, such as lack of highly selective adsorption sites and slow adsorption rate.

The introduction of molecular imprinting technology can solve the above problems to some extent. A molecular recognition system is usually created by imprinting template molecules in a polymer matrix through non-covalent or covalent interaction between template molecules and functional polymerization monomers. When the template molecules are eluted, they will form recognition sites or holes that match the shape and size of the template molecules and complement their functions, so as to realize selective recognition of the target molecules (Xu W, Wang Y, Wei X, et al, Analytica chimica acta, 2019, 1048: 1-11). Compared with traditional bulk polymeric imprinted materials, surface molecularly imprinted adsorbents have more effective binding sites, faster adsorption kinetics and larger adsorption capacity (Qian J, Zhang S, Zhou Y, et al, RSC Adv, 2015, 5(6): 4153-4161).

In addition, the introduction of magnetic materials can realize the rapid recovery of adsorption materials (Kong X, Gao R, He X, et al, Journal of chromatography A, 2012, 1245: 8-16).

Some researchers have done some research on the selective separation of other phenolic acids (Fan D, Jia L, Xiang H, et al, Food chemistry, 2017, 224: 32-36). But so far, there is no report on surface imprinted material used for selective adsorption of salvianolic acid A.

SUMMARY

The objective of the present application is to provide a surface molecularly imprinted magnetic nanomaterial of salvianolic acid A, its preparation method and application.

The objective of the present application is realized by the following technical solution.

A method for preparing a surface molecularly imprinted magnetic nanomaterial of salvianolic acid A, including the following steps:

(1) dispersing 0.1 g of silicon dioxide-coated ferroferric oxide particles with surface-grafted carbon-carbon double bonds $Fe_3O_4@SiO_2—C{=}C$ in 15-20 mL of acetone;

(2) adding 5 mL of a salvianolic acid A solution with a concentration of 5 mg/mL, 0.05-0.2 g of 4-acryloyloxy phenylboronic acid, 50-200 μL of vinyl imidazole, 25-100 μL of methacryloylpropyl trimethyl ammonium chloride, 0.015-0.06 g of bismethylene acrylamide, and 0.01-0.04 g of an azoamidine initiator into an acetone suspension solution obtained in step 1.

(3) heating the mixed solution in step 2 to 65-75° C., keeping away from light, and continuously stirring and reacting for 4-18 h in argon atmosphere;

(4) eluting a product obtained in step 3 with an acid, removing the template salvianolic acid A, and washing and drying to obtain the surface molecularly imprinted magnetic nanomaterial of salvianolic acid A.

Further, the silicon dioxide-coated ferroferric oxide particles with surface-grafted carbon-carbon double bonds $Fe_3O_4@SiO_2—C{=}C$ in the step 1 are prepared by the following method:

synthesizing $Fe_3O_4$ nanoparticles by a hydrothermal method, adding tetraethyl orthosilicate for coating silicon dioxide on surface of the $Fe_3O_4$ nanoparticles, and adding a silane coupling agent KH570 for grafting double bonds, to obtain $Fe_3O_4@SiO_2—C{=}C$.

Further, in step 2, the addition amounts of 4-acryloyloxy phenylboronic acid, vinyl imidazole, methacryloylpropyl trimethyl ammonium chloride, bismethylene acrylamide and azoamidine initiator are 0.2 g, 200 μL, 100 μL, 0.06 g and 0.04 g, respectively.

Further, in step 2, the azoamidine initiator is V50.

Further, in step 4, 120 mL of 0.1M HCl is used to elute the product obtained in step 3.

The surface molecularly imprinted magnetic nanomaterial of salvianolic acid A prepared by the above method is spherical particles with a core-shell structure of about 200-300 nm, with positive charge on the surface, strong hydrophilicity and magnetism, and can be recycled. Based on the synergistic effect of boric acid and alkali, it can realize rapid, large-capacity and high-selectivity separation and enrichment of salvianolic acid A.

The present application also provides use of the surface molecularly imprinted magnetic nanomaterial of salvianolic acid A in the separation and enrichment of salvianolic acid A.

The present application has the beneficial effects that the surface molecularly imprinted magnetic nanomaterial prepared by the present application is spherical particles with a core-shell structure of about 250 nm, with positive charge on the surface, strong hydrophilicity and magnetism, and can be recycled. Based on the synergistic effect of boric acid and alkali, it can realize rapid, large-capacity and high-selectivity separation and enrichment of salvianolic acid A.

BRIEF DESCRIPTION OF DRAWINGS

The present application will be further explained with reference to the following drawings and examples.

DESCRIPTION OF EMBODIMENTS

Figure 1:
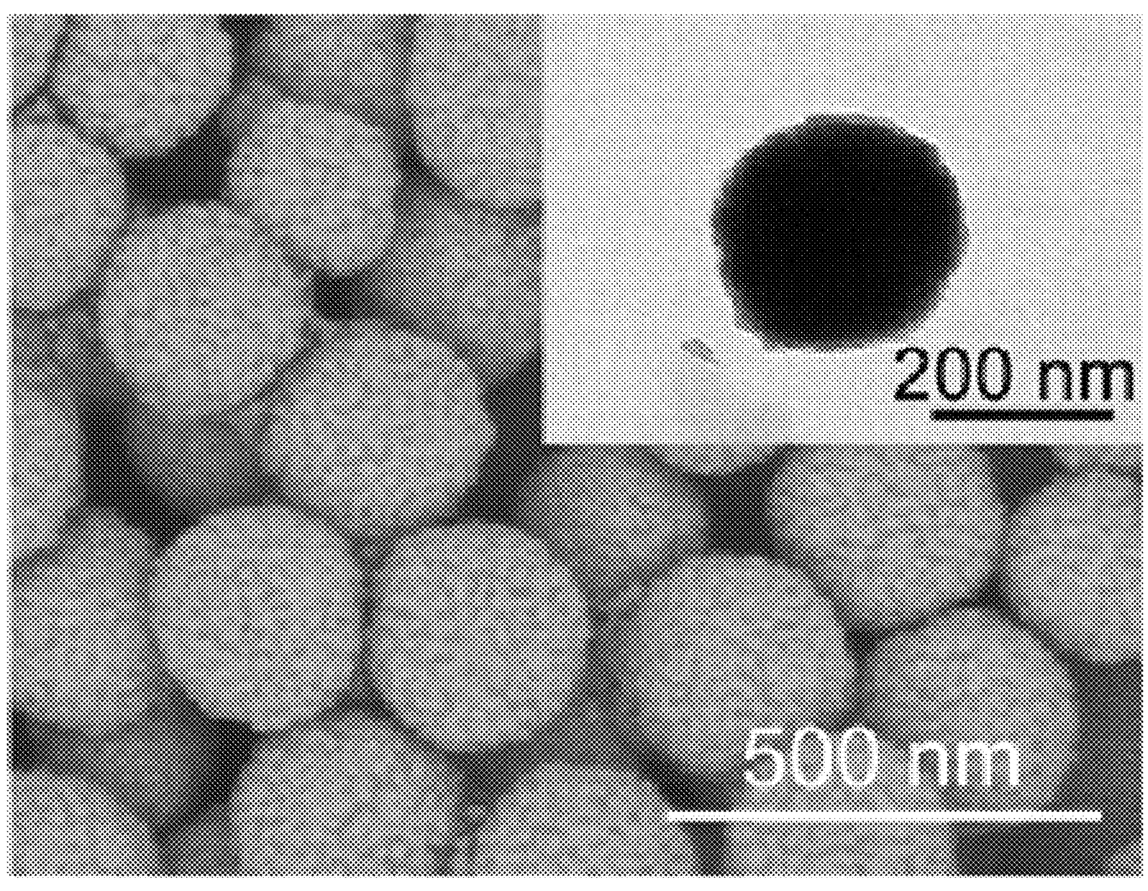
FIG. 1 is a scanning electron microscope and transmission electron microscope picture of the surface molecularly imprinted magnetic nanomaterial of salvianolic acid A prepared in Example 1.

The present application provides a preparation method of a surface molecularly imprinted magnetic nanomaterial of salvianolic acid A. The method is based on the fact that salvianolic acid A has a structure of a plurality of pyrocatechols, and boric acid and pyrocatechol compounds can quickly form covalent cyclic borate groups, thereby imprinting the template molecule salvianolic acid A in the polymer matrix by polymerization of 4-acryloyloxy phenylboronic acid, vinyl imidazole, methacryloylpropyl trimethyl ammonium chloride and bismethylene acrylamide on the surface of $Fe_304@SiO_2$—C═C. The formation of borate is reversible, and the reaction is affected by the environmental pH value: it usually exists stably under neutral or alkaline conditions. Finally, the template molecules are eluted with an acidic solution to form the surface molecularly imprinted magnetic nanomaterial of salvianolic acid A.

In the surface molecularly imprinted magnetic nanomaterial of salvianolic acid A prepared by the present application, the introduction of the phenylboronic acid functional group can quickly identify salvianolic acid A and combine with it, thus realizing faster adsorption kinetics on the basis of improving selectivity. Methacryloylpropyl trimethyl ammonium chloride has positive charge, and thus can be combined with ionized salvianolic acid A with negative charge through electrostatic interaction, thus improving the selectivity of the material. Vinyl imidazole is an organic weak base, which can effectively neutralize the acidity of a salvianolic acid A solution and maintain a suitable pH value for the stable combination of the boric acid group and ortho-phenolic hydroxyl group. Moreover, vinyl imidazole can be protonated under acidic conditions, and then combine with salvianolic acid A by electrostatic interaction. At the same time, the amino group on vinyl imidazole can also form hydrogen bond with salvianolic acid A. The strong hydrophilic property of vinyl imidazole can also improve the hydrophilicity of the whole adsorption material and further promote the rapid adsorption. Because the formation of borate is reversible, it is easy to decompose under acidic conditions. Therefore, the desorption of salvianolic acid A can be realized by adjusting the pH value, that is, salvianolic acid A can be efficiently and quickly eluted from the adsorbent by an acid solution.

The prepared surface molecularly imprinted magnetic nanomaterial of salvianolic acid A is spherical particles with a core-shell structure of about 250 nm, with positive charge on the surface, strong hydrophilicity and magnetism, and can be recycled. Based on the synergistic effect of boric acid and alkali, it can realize rapid, large-capacity and high-selectivity separation and enrichment of salvianolic acid A.

The proportion and conditions of this chemical reaction are obtained by a skilled person through long-term exploration and experience accumulation, but the skilled person in this field cannot acquire the method to prepare it from the existing reaction technology. Up to now, there is no report of surface molecularly imprinted magnetic nanomaterials of salvianolic acid A.

The purpose and effect of the present application will become more apparent from the detailed description of the present application in the following examples and drawings.

Example 1

Figure 2:
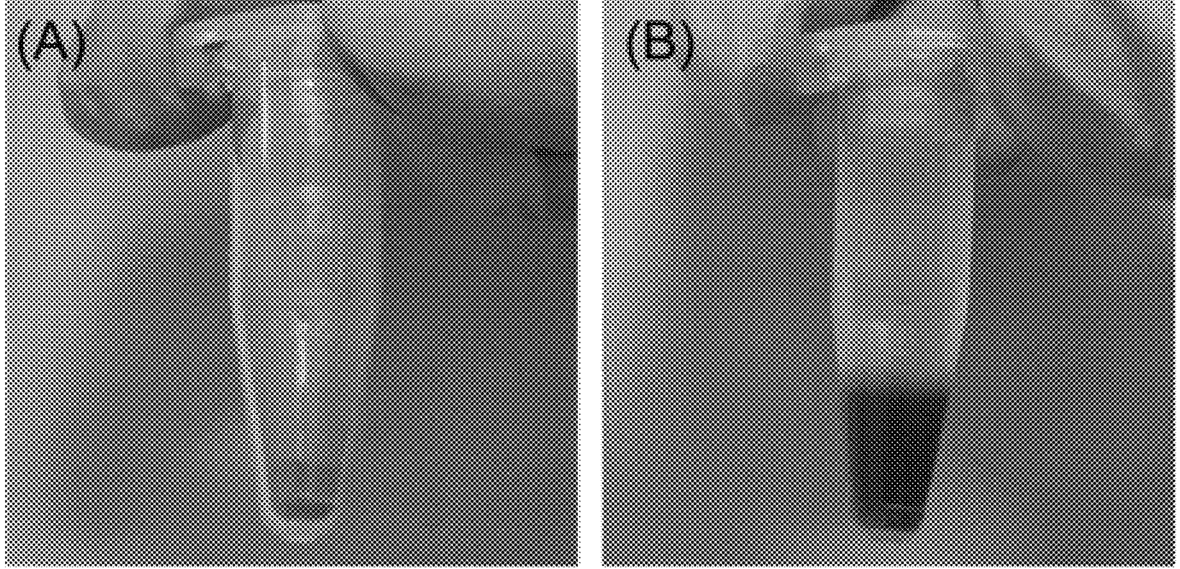
FIG. 2 is a photo of the surface molecularly imprinted magnetic nanomaterial of salvianolic acid Ain Example 1 before (A) and after (B) water absorption.
Figure 3:
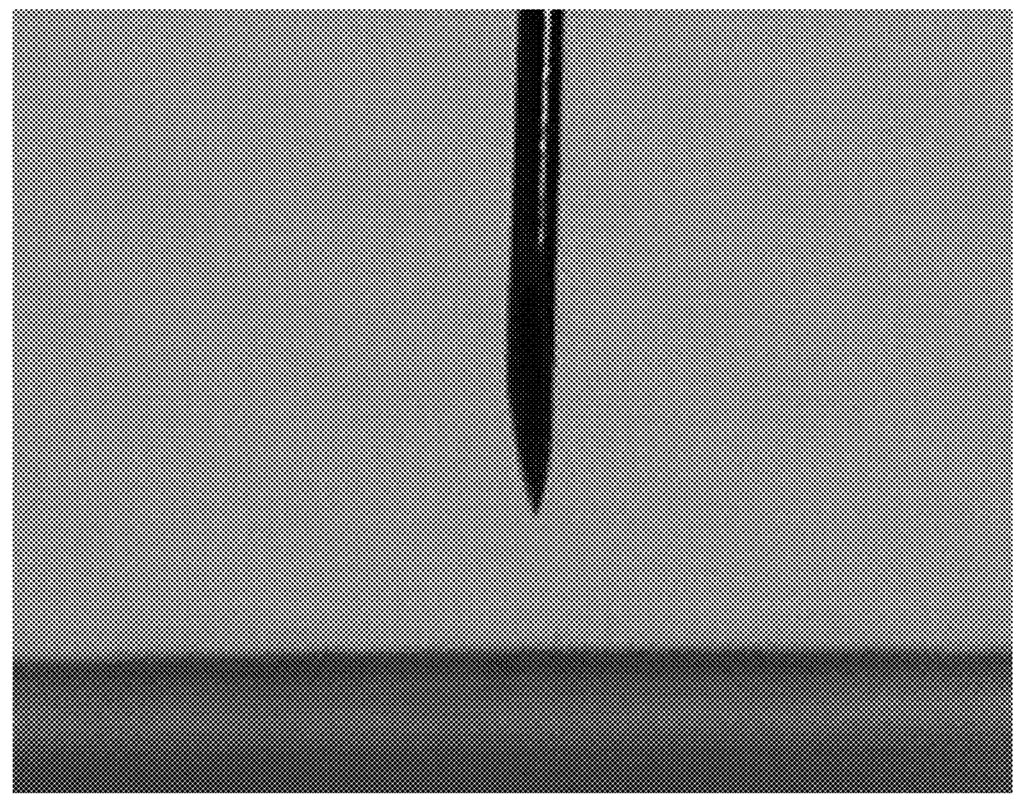
FIG. 3 is a water contact angle diagram of the surface molecularly imprinted magnetic nanomaterial of salvianolic acid A in Example 1.
Figure 4:
FIG. 4 is a schematic diagram of the surface molecularly imprinted magnetic nanomaterial of salvianolic acid A adsorbed and separated by a magnet in Example 1.

$Fe_3O_4$ nanoparticles were prepared by hydrothermal synthesis, tetraethyl orthosilicate was added for coating silicon dioxide on the surface of the $Fe_3O_4$ nanoparticles, and a silane coupling agent KH570 was added for grafting double bonds, to prepare $Fe_3O_4@SiO_2$—C═C. 0.1 g of the prepared $Fe_3O_4@SiO_2$—C═C was ultrasonically dispersed in 15 mL acetone. Then 5 mL of a salvianolic acid A solution with a concentration of 5 mg/mL, 0.2 g of 4-acryloyloxy phenylboronic acid, 200 μL of vinyl imidazole, 100 μL of methacryloylpropyl trimethyl ammonium chloride, 0.06 g of bismethylene acrylamide and 0.04 g of azoamidine initiator V50 were added into the suspension solution, argon was introduced for 30 min, and the mixture was continuously stirred at room temperature for 4 h. The mixed solution was heated to 65° C., protected from light, and argon gas was introduced for 10 min, so that the mixture reacted for 18 h under continuous stirring. The reactants were eluted with 120 mL of 0.1 M HCl for three times to remove template salvianolic acid A. Finally, the product was washed with ultrapure water and absolute ethanol, and dried in vacuum at room temperature. The product was spherical particles with a core-shell structure of about 250 nm, and its structure is shown in FIG. 1. The surface zeta potential of the surface molecularly imprinted magnetic nanomaterial of salvianolic acid A was measured, and the surface potential was 37.8 mV The material is hydrophilic, its volume expands nearly 10 times after absorbing water (FIG. 2), and its water contact angle is close to 0° (FIG. 3). The surface molecularly imprinted magnetic nanomaterial of salvianolic acid A has magnetism, as shown in FIG. 4.

Example 2

Figure 5:
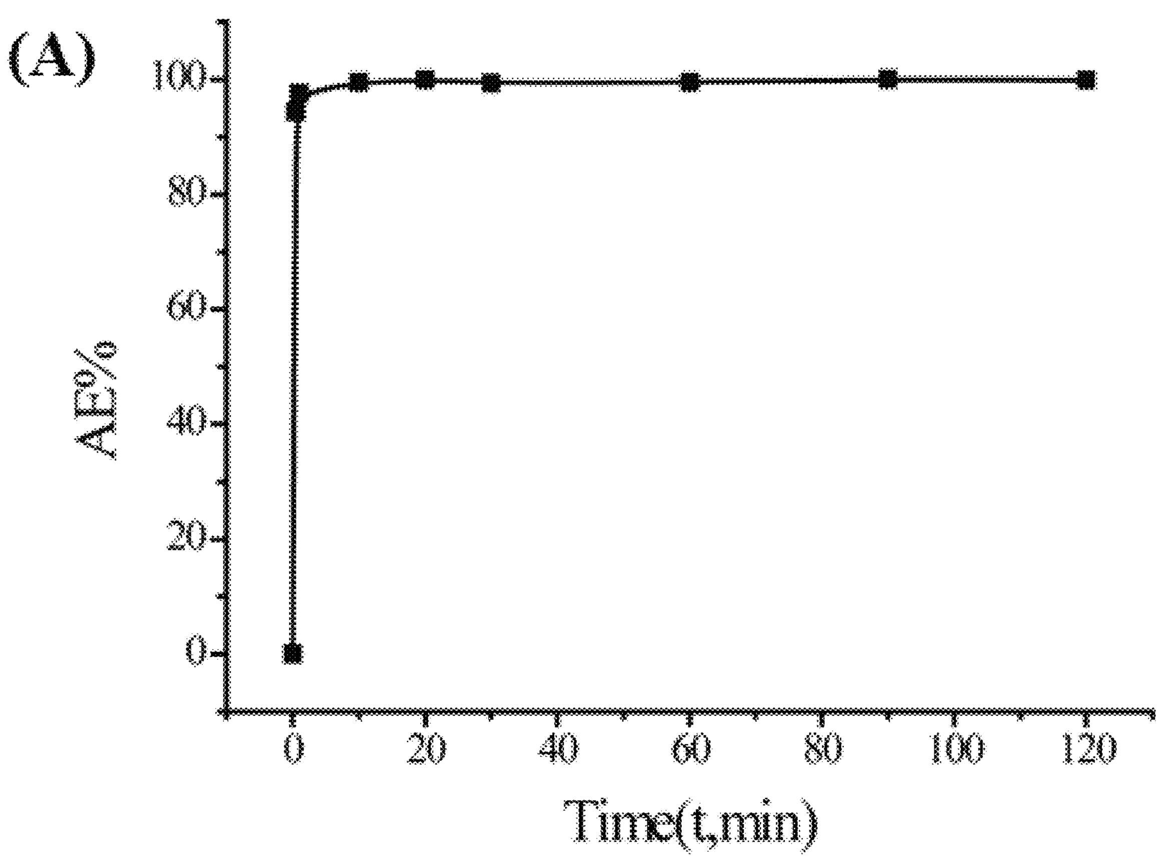
FIG. 5 shows the influence of the contact time on adsorption of salvianolic acid A by the surface molecularly imprinted magnetic nanomaterials of salvianolic acid A in Example 2, in which, (A) the initial concentration of salvianolic acid A is 0.5 mg/mL, and (B) the initial concentration of salvianolic acid A is 0.01 mg/mL.
Figure 5:
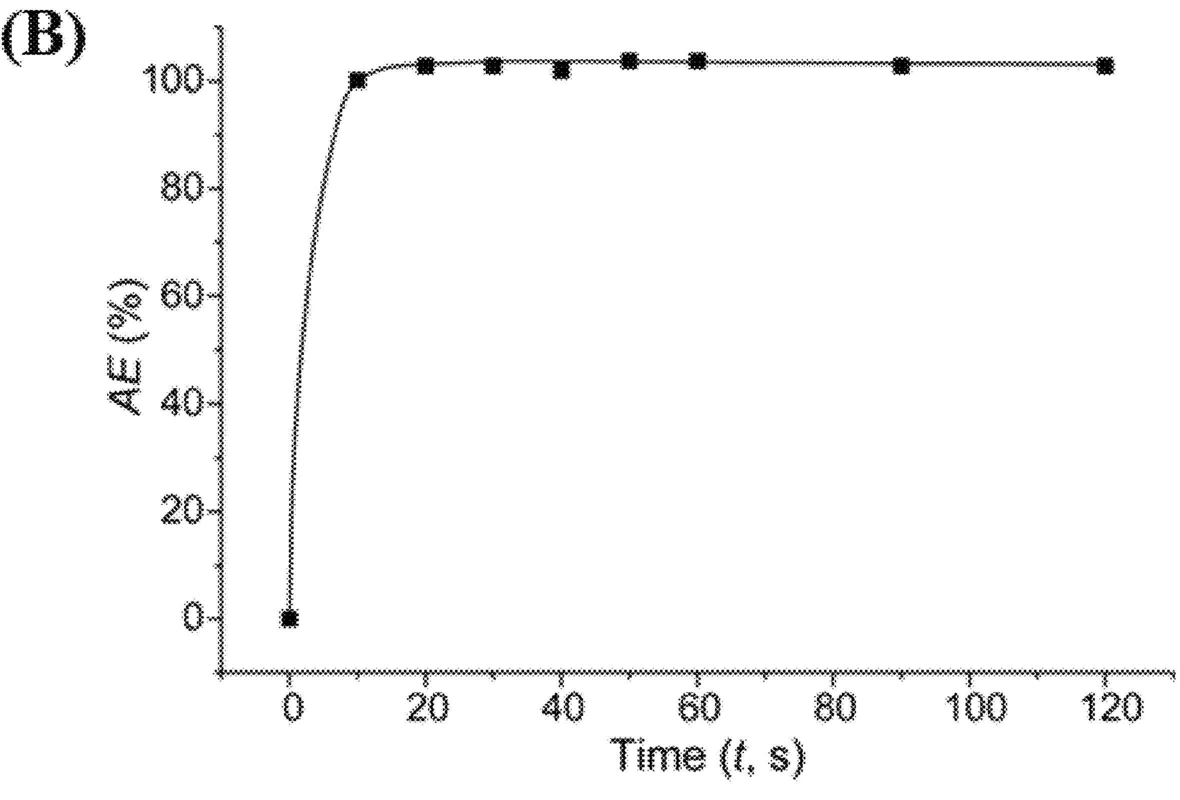

At the temperature of 25° C., several polyethylene centrifuge tubes were used, a certain amount of the adsorbent in Example 1 and a solution of salvianolic acid A of 0.5 mg/mL or 0.01 mg/mL (1 g/L adsorbent dosage) were added into the centrifuge tubes, and the mixture was shaken at 220 rpm with a constant temperature shaker; one centrifuge tube was taken out at intervals. The adsorption material was separated from the solution by magnet, and the concentration of salvianolic acid A before and after adsorption was measured by a ultraviolet spectrophotometer. As a result, the adsorption material could reach the adsorption equilibrium within 10 min, and the adsorption efficiency was above 90%. When the concentration of salvianolic acid A was 0.01 mg/mL, the adsorption material could reach the adsorption equilibrium in 10 s (FIG. 5). The adsorption behavior was fitted with the adsorption kinetic model (Table 1), and the results showed that it was in accordance with the second-order kinetic equation as shown below:

$$\frac{t}{q_t} = \frac{1}{k_2 \times q_e^2} + \frac{t}{q_e},$$

$k_2$ (g/mg/min) is a second-order kinetic constant, $q_e$ represents the equilibrium adsorption capacity, and qt represents the adsorption capacity at time t. Through straight line fitting, it can be seen that the first-order kinetic model of the adsorbent is completely non-linear and the correlation coefficient is poor, while the second-order kinetic model is highly linear and has a large correlation coefficient R (>0.99). Therefore, the second-order kinetic equation can better describe the adsorption process of salvianolic acid A by the adsorbent.

TABLE 1

Adsorption kinetic parameters of salvianolic acid A adsorbed by surface molecularly imprinted magnetic nanomaterial of salvianolic acid A in Example 1

| | | First-order dynamic model fitting | | | Second-order dynamic model fitting | | |
|---|---|---|---|---|---|---|---|
| Adsorbent | $q_{e, exp}$ (mg/g) | $k_1$ ($min^{-1}$) | $q_{e, cal}$ (mg/g) | $R^2$ | $k_2$ (g/mg/min) | $q_{e, cal}$ (mg/g) | $R^2$ |
| Imprinted material | 496.1 | 0.039 | 14.75 | 0.369 | 0.037 | 495.0 | 0.999 |

Example 3

Figure 6:
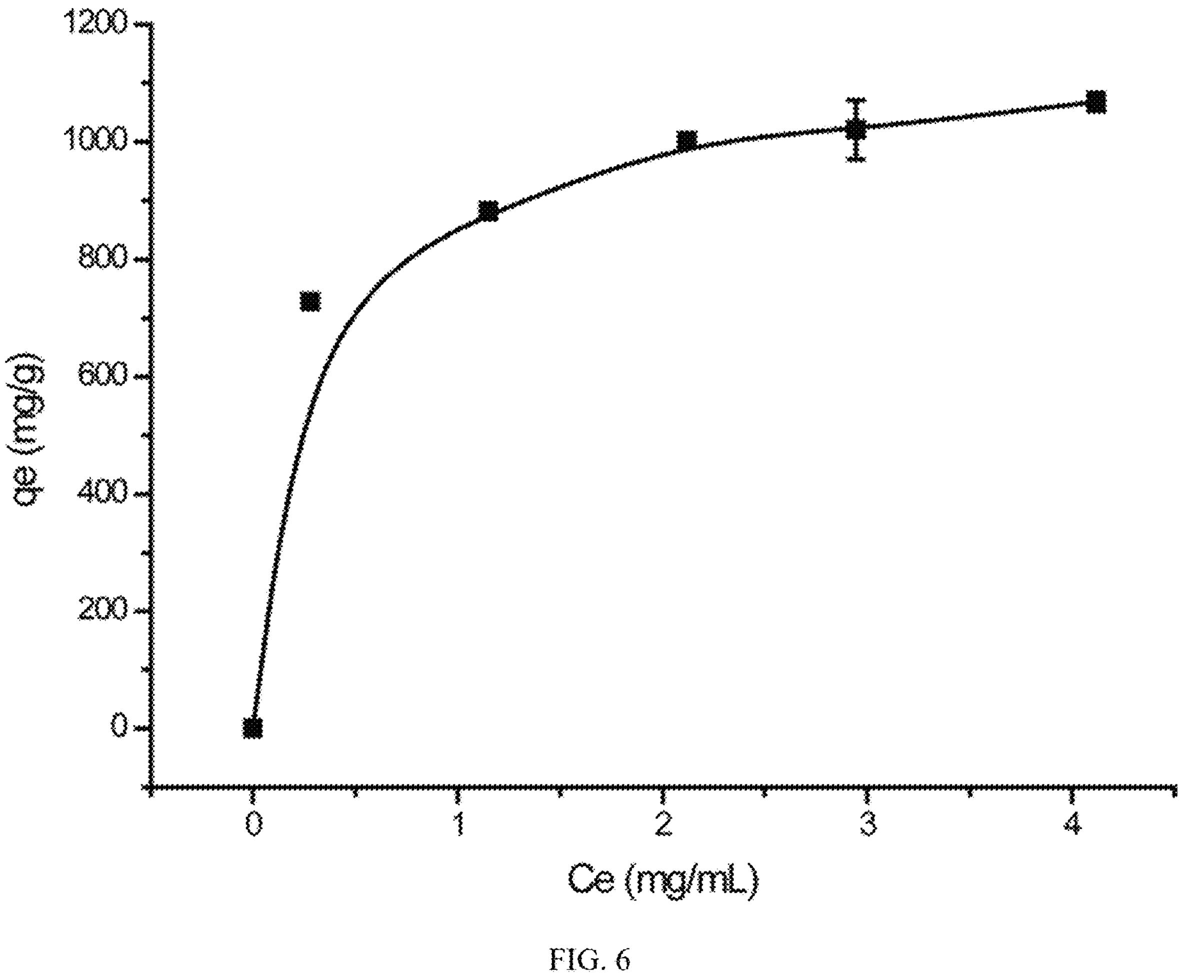
FIG. 6 is the adsorption isotherm of salvianolic acid A by the surface molecularly imprinted magnetic nanomaterial of salvianolic acid A in Example 3.

At the temperature of 25° C., several polyethylene centrifuge tubes were used, and a certain amount of the adsorption material in Example 1 was added to the solution of salvianolic acid A (1 g/L adsorbent dosage) with different initial concentrations (1, 2, 3, 4, 5 mg/mL). Then, the mixture was shaken to the adsorption equilibrium with a constant temperature shaker at 220 rpm, and then the concentrations of salvianolic acid A in the solution before and after adsorption were measured. The adsorption behavior was fitted by Langmuir and Freundlich adsorption isotherm models, and it was judged that the adsorption model of salvianolic acid A by the surface molecularly imprinted materials was a Langmuir model. According to the Langmuir model, the maximum adsorption capacity ($q_{max}$) of the imprinted adsorbent can reach 1117.6 mg/g (FIG. 6 and Table 2).

TABLE 2

Adsorption isotherm parameters of salvianolic acid A adsorbed by surface molecularly imprinted magnetic nanomaterial of salvianolic acid A in Example 1

| | Langmuir | | | Freundlich | | |
|---|---|---|---|---|---|---|
| Adsorbent | $q_{max}$ (mg/g) | b (L/mg) | $R^2$ | $K_F$ ($mg^{n-1/n}mL^{1/n}g$) | n | $R^2$ |
| Imprinted material | 1117.6 | 0.0045 | 0.9976 | 880.6 | 6.85 | 0.9903 |

Note: b is a Langmuir's constant, $K_F$ is a Friedrich's constant, and 1/n is fractional homogeneity coefficient.

Example 4

Figure 7:
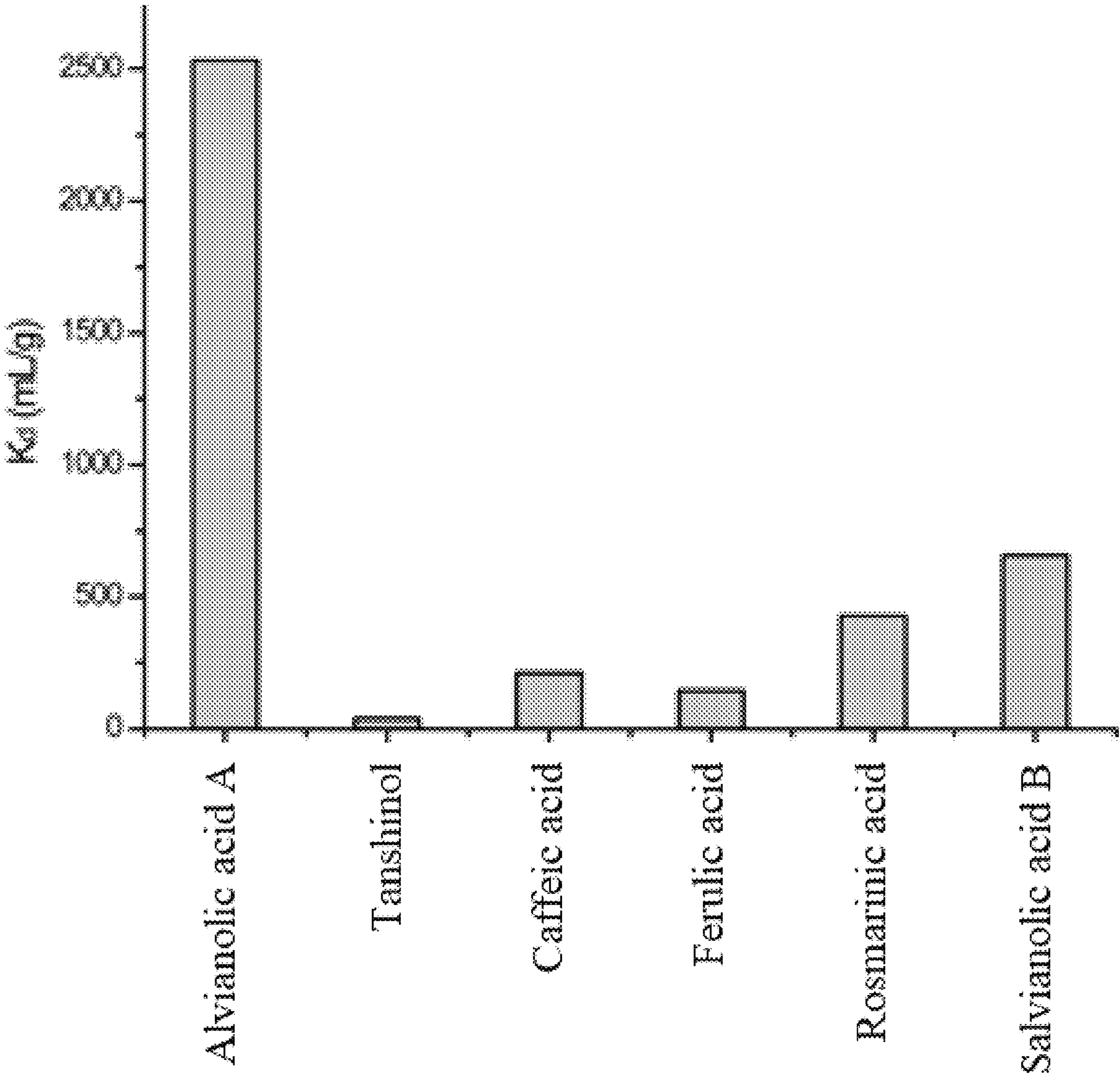
FIG. 7 shows the selective partition coefficient of six phenolic acids by the surface molecularly imprinted magnetic nanomaterial of salvianolic acid A in Example 4.

Salvianolic acid B, rosmarinic acid, tanshinol, caffeic acid and ferulic acid were selected as the competitive molecules of salvianolic acid A, and these six phenolic acids were divided into 0.5 mg/mL mixed standard solutions. A certain amount of the adsorbent in Example 1 was added to the 0.5 mg/mL mixed standard solution (1 g/L adsorbent dosage), and the mixture was shaken to the adsorption equilibrium with a constant temperature shaker at 220 rpm. The concentrations of six phenolic acids before and after adsorption were detected by high performance liquid chromatography. The results show that the selective partition coefficient ($K_d$) of the imprinted material to salvianolic acid A is obviously higher than other phenolic acid components, and the adsorption material has strong affinity and selectivity to salvianolic acid A (FIG. 7).

Example 5

$Fe_3O_4$ nanoparticles were prepared by hydrothermal synthesis, tetraethyl orthosilicate was added for coating silicon dioxide on the surface of the $Fe_3O_4$ nanoparticles, and a silane coupling agent KH570 was added for grafting double bonds to prepare $Fe_3O_4$@$SiO_2$—C═C. 0.1 g of the prepared $Fe_3O_4$@$SiO_2$—C═C was ultrasonically dispersed in 20 mL acetone. Then 5 mL of a salvianolic acid A solution with a concentration of 5 mg/mL, 0.05 g of 4-acryloyloxy phenylboronic acid, 50 μL of vinyl imidazole, 25 μL of methacryloylpropyl trimethyl ammonium chloride, 0.015 g of bismethylene acrylamide and 0.01 g of azoamidine initiator V50 were added into the suspension solution, argon was introduced for 30 min, and the mixture was continuously stirred at room temperature for 4 h. The mixed solution was heated to 70° C., protected from light, and argon gas was introduced for 10 min, so that the mixture reacted for 4 h under continuous stirring. The reactants were eluted with 120 mL of 0.1 M HCl for three times to remove template salvianolic acid A. Finally, the product was washed with ultrapure water and absolute ethanol, and dried in vacuum at room temperature.

Example 6

$Fe_3O_4$ nanoparticles were prepared by hydrothermal synthesis, tetraethyl orthosilicate was added for coating silicon dioxide on the surface of the $Fe_3O_4$ nanoparticles, and a silane coupling agent KH570 was added for grafting double bonds to prepare $Fe_3O_4@SiO_2$—C═C. 0.1 g of the prepared $Fe_3O_4@SiO_2$—C═C was ultrasonically dispersed in 15 mL acetone. Then 5 mL of a salvianolic acid A solution with a concentration of 5 mg/mL, 0.1 g of 4-acryloyloxy phenylboronic acid, 100 μL of vinyl imidazole, 50 μL of methacryloylpropyl trimethyl ammonium chloride, 0.03 g of bismethylene acrylamide and 0.02 g of azoamidine initiator V50 were added into the suspension solution, argon was introduced for 30 min, and the mixture was continuously stirred at room temperature for 5 h. The mixed solution was heated to 75° C., protected from light, and argon gas was introduced for 10 min, so that the mixture reacted for 18 h under continuous stirring. The reactants were eluted with 120 mL of 0.1 M HCl for three times to remove template salvianolic acid A. Finally, the product was washed with ultrapure water and absolute ethanol, and dried in vacuum at room temperature.

Example 7

Figure 8:
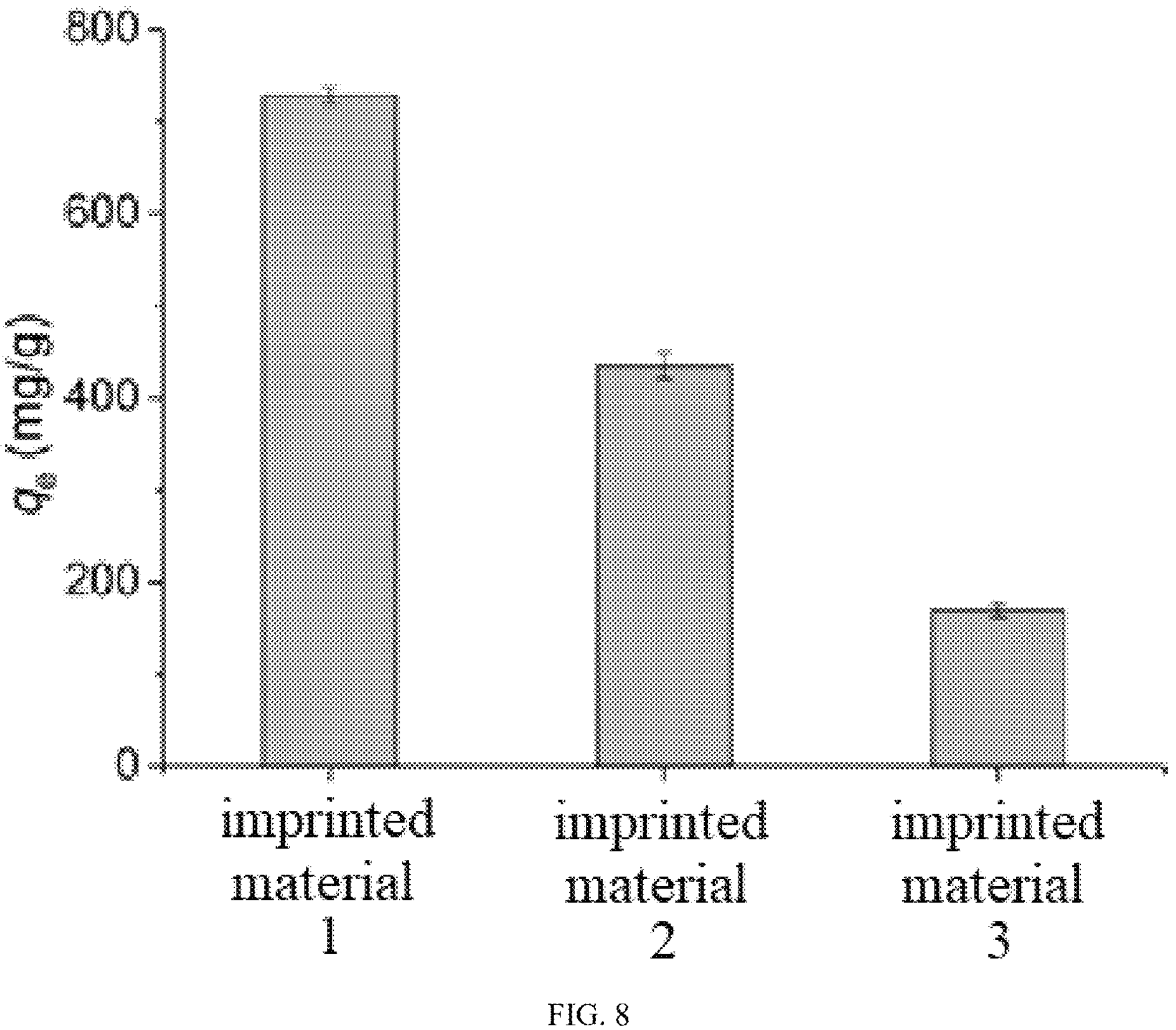
FIG. 8 is a comparison chart of adsorption capacities of imprinted materials 1, 2 and 3 prepared in Examples 1, 5 and 6.

The imprinted materials prepared in Examples 1, 5 and 6 were named imprinted materials 1, 2 and 3 respectively. At the temperature of 25° C., several polyethylene centrifuge tubes were used, and a certain amount of imprinted materials 1, 2 and 3 in Examples 1, 5 and 6 were added to a 1 mg/mL solution of salvianolic acid A (1 g/L adsorbent dosage) respectively. Then, the mixture was shaken to the adsorption equilibrium with a constant temperature shaker at 220 rpm, and then the concentrations of salvianolic acid A in the solution before and after adsorption were measured. The results show that imprinted materials 1, 2 and 3 all have good adsorption effects, and the adsorption capacity of imprinted material 1 is larger than that of imprinted materials 2 and 3 (FIG. 8).

The above examples are used to illustrate, rather than to limit the present application. Any modifications and changes made to the present application within the scope of protection of the spirit and claims of the present application will shall fall within the scope of protection of the present application.

What is claimed is:

1. A method for preparing a surface molecularly imprinted magnetic nanomaterial of salvianolic acid A, comprising the following:

(1) dispersing 0.1 g of silicon dioxide-coated ferroferric oxide particles with surface-grafted carbon-carbon double bonds $Fe_3O_4@SiO_2$—C═C in 15 mL-20 mL of acetone;

(2) adding 5 mL of a salvianolic acid A solution with a concentration of 5 mg/mL, 0.05 g-0.2 g of 4-acryloyloxy phenylboronic acid, 50 μL-200 μL of vinyl imidazole, 25 μL-100 μL of methacryloylpropyl trimethyl ammonium chloride, 0.015 g-0.06 g of bismethylene acrylamide, and 0.01 g-0.04 g of an azoamidine initiator into an acetone suspension solution obtained in step 1;

(3) heating a mixed solution in step 2 to 65° C.-75° C., keeping away from light, and continuously stirring and reacting for 4 h-18 h in argon atmosphere; and (4) eluting a product obtained in step 3 with an acid, removing the template salvianolic acid A, and washing and drying to obtain the surface molecularly imprinted magnetic nanomaterial of salvianolic acid A.

2. The method according to claim 1, wherein, the silicon dioxide-coated ferroferric oxide particles with surface-grafted carbon-carbon double bonds $Fe_3O_4@SiO_2$—C═C in the step 1 are prepared by the following method:

synthesizing $Fe_3O_4$ nanoparticles by a hydrothermal method, adding tetraethyl orthosilicate for coating silicon dioxide on surface of the $Fe_3O_4$ nanoparticles, and adding a silane coupling agent KH570 for grafting double bonds, to obtain $Fe_3O_4@SiO_2$—C═C.

3. The method according to claim 1, wherein, in step 2, the addition amounts of 4-acryloyloxy phenylboronic acid, vinyl imidazole, methacryloylpropyl trimethyl ammonium chloride, bismethylene acrylamide and azoamidine initiator are 0.2 g, 200 μL, 100 μL, 0.06 g and 0.04 g, respectively.

4. The method according to claim 1, wherein, in step 2, the azoamidine initiator is V50.

5. The method according to claim 1, wherein, in step 4, using 120 mL of 0.1M HCl to elute the product obtained in step 3.

* * * * *